United States Patent
Sherwood et al.

(10) Patent No.: US 7,205,018 B2
(45) Date of Patent: Apr. 17, 2007

(54) CARBONATED PROTEIN DRINK AND METHOD OF MAKING

(75) Inventors: Shawn Sherwood, Carlsbad, CA (US); David Jenkins, San Diego, CA (US)

(73) Assignee: Next Proteins, Inc., Carlsbad, CA (US)

(*) Notice: Subject to any disclaimer, the term of this patent is extended or adjusted under 35 U.S.C. 154(b) by 0 days.

(21) Appl. No.: 11/215,524

(22) Filed: Aug. 30, 2005

(65) Prior Publication Data

US 2006/0083844 A1 Apr. 20, 2006

Related U.S. Application Data

(60) Provisional application No. 60/648,974, filed on Jan. 31, 2005, provisional application No. 60/648,914, filed on Jan. 31, 2005, provisional application No. 60/617,146, filed on Oct. 7, 2004.

(51) Int. Cl.
*A23L 21/00* (2006.01)
*A23L 2/54* (2006.01)

(52) U.S. Cl. ............... 426/583; 426/477; 426/520; 426/521; 426/522; 426/656; 426/590

(58) Field of Classification Search ........... 426/583, 426/590, 656, 477, 520, 521, 522
See application file for complete search history.

(56) References Cited

U.S. PATENT DOCUMENTS

| | | | |
|---|---|---|---|
| 3,846,560 A * | 11/1974 | Hempenius et al. ........ 426/18 |
| 4,790,998 A | 12/1988 | Swartz | |
| 4,804,552 A | 2/1989 | Ahmed et al. | |
| 5,520,948 A | 5/1996 | Kvamme | |
| 5,641,531 A | 6/1997 | Liebrecht et al. | |
| 6,060,103 A | 5/2000 | Dunagan | |
| 6,106,874 A | 8/2000 | Liebrecht et al. | |
| 6,261,589 B1 | 7/2001 | Pearson et al. | |
| 6,403,129 B1 | 6/2002 | Clark et al. | |
| 6,432,929 B1 | 8/2002 | Stone | |
| 6,623,781 B2 | 9/2003 | Rizvi et al. | |
| 6,740,344 B2 | 5/2004 | Murphy et al. | |
| 6,761,920 B1 | 7/2004 | Kaplan | |
| 6,866,877 B2 | 3/2005 | Clark et al. | |
| 2002/0127317 A1 | 9/2002 | Hotchkiss et al. | |
| 2003/0099753 A1 | 5/2003 | Yang | |
| 2003/0113408 A1 | 6/2003 | Clark et al. | |
| 2005/0003054 A1* | 1/2005 | McCampbell ........... 426/321 |
| 2005/0106218 A1 | 5/2005 | Ward et al. | |
| 2005/0106305 A1 | 5/2005 | Abraham et al. | |

OTHER PUBLICATIONS

Kudryavtseva, T. A. et al. "A method worked out for the manufacture of carbonated beverages". Leningradskii Tekh, Inst. Kholodil'noi Promyshlennosti, Leningrad, USSR (abstract)1981. . Dialog, FSTA. , published by FSTA IFIS publishing in 2006.*

* cited by examiner

*Primary Examiner*—Helen Pratt
(74) *Attorney, Agent, or Firm*—Bernard L. Kleinke; Duckor Spradling Metzger & Wynne

(57) ABSTRACT

An improved carbonated protein beverage/drink composition which provides a relatively high protein content, ranging from about 2% by weight to about 15% by weight, while simultaneously employing a carbonation concentration between about 0.1 volumes of carbonation (per volume of liquid drink solution or liquid drink suspension) to about 4 volumes of carbonation. Preferably the protein is whey protein. The carbonated protein beverage has been heat treated to inactivate microbes in the presence of the carbonation which is used to provide taste and mouth feel for the drink. Typically, the treatment for microbe inactivation is carried out in the individual package used for storage and handling of the carbonated protein drink.

20 Claims, No Drawings

CARBONATED PROTEIN DRINK AND METHOD OF MAKING

This application is related to Provisional Application Ser. No. 60/617,146, filed Oct. 7, 2004, and entitled: "Carbonated Whey Protein Beverage"; Provisional Application Ser. No. 60/648,914, filed Jan. 31, 2005, and entitled: "Carbonated Aqueous Whey Protein Beverage And Method Of Making Same"; and, Provisional Application Ser. No. 60/648,974, filed Jan. 31, 2005, and entitled: "Dry Carbonated Whey Protein Beverage And Method Of Making Same". Priority is claimed under each of these provisional applications and each is hereby incorporated by reference in its entirety.

BACKGROUND OF THE INVENTION

1. Field of the Invention

The present invention pertains to a carbonated protein beverage, and to methods of making the beverage.

2. Brief Description of the Background Art

This section describes background subject matter related to the disclosed embodiments of the present invention. There is no intention, either express or implied, that the background art discussed in this section legally constitutes prior art.

Carbonated dairy products have been highly sought after, and several different kinds of product have been developed. One of the more serious obstacles to be overcome is production of a highly carbonated drink (where the carbonation accounts for at least half of the volume of the product) without incurring separation out or precipitation of the dairy protein from the liquid during manufacture and handling, shipping and storage. In addition to manufacturability and shelf life, the taste of the carbonated dairy product has been affected by the kind of proteins present in combination with the carbonation.

Whey protein is a protein fraction obtained from the milk of cows. Milk contains two major protein fractions, including casein, which provides about 80% by weight of the total protein, and whey protein, which provides about 20% by weight of the total protein. Whey protein includes several protein fractions, including, for example, β-lactoglobulin, α-lactoglobulin, Lactalbumin, immunoglobulins (such as IgG1, IgG2, IgA, and IgM, for example), lactoferrin, glycomacropeptides, and lactoperoxidase. Whey protein is more soluble than casein and also has a higher biological value and/or protein digestibility corrected amino acid score (PDCAAS). Whey protein is a rich source of branched chain amino acids (BCAAs), containing the highest known levels of any natural food source. BCAAs are important for athletes, since, unlike the other essential amino acids, they are metabolized directly into muscle tissue and are the first amino acids used during periods of exercise and resistance training. Leucine is important for athletes as it plays a key role in muscle protein synthesis and lean muscle support and growth. Research has shown that individuals who exercise benefit from diets high in leucine and have more lean muscle tissue and less body fat than individuals whose diet contains lower levels of leucine. Whey protein isolate has approximately 45% by weight more leucine than soy protein isolate. Whey protein is available as whey protein concentrate, which may be selected to contain whey protein at a given concentration which may range from about 20% by weight to about 85% by weight protein. Whey protein isolate contains 90% by weight or more whey protein, and little, if any, fat cholesterol, or carbohydrates (e.g., lactose).

Whey protein contains all of the essential amino acids, and therefore, is a high quality, complete source of protein, where complete means that whey protein contains all the essential amino acids for growth of body tissues. Since whey protein is available in forms containing little fat and carbohydrates, it can be a particularly valuable source of nutrition for athletes and for individuals with special medical needs (e.g., lactose intolerant individuals), and can be a valuable component of a diet program. Further, since whey protein contains biologically active proteins such as the immunoglobulins, lactoperoxidase, and lactoferrin, this provides advantages over other protein sources such as soy protein. Whey protein also has a fresh, neutral taste and, therefore, can be included in other foods without adversely affecting the taste.

Given the advantages of whey protein, it has become a popular source of nutrition in the form of whey protein supplemented candy bars and in whey protein powders, available from Next Proteins International, Carlsbad Calif.; a description of these nutritional items is available at the Next Proteins International website on www.nextproteins.com.

In an effort to increase the availability and use of whey protein, efforts have been made to include whey protein drinks among currently available dairy protein drinks. In particular, efforts have been made to include whey protein as a protein source in carbonated beverages. Unfortunately, the carbonation process generally results in destabilization of whey protein, resulting in foaming and/or gelling problems. As a result, the amount of whey protein that has been included in carbonated beverages has been severely limited.

An article by V. H. Holsinger in Adv. Exp. Med. Biol. 1978; 105:735–47, titled: "Fortification of soft drinks with protein from cottage cheese whey", describes preparation of cottage cheese whey protein concentrates which have the solubility, stability, and flavor to make them suitable for fortification of soft drinks and related products. Carbonated beverages prepared with conventional beverage ingredients and containing up to 1% by weight of the total beverage of added whey protein are said to have maintained clarity, color, and flavor during 203 days of storage at room temperature. Clarity of 1% protein solutions at a pH of 2–3.4 is said to be unimpaired by heating for 6 hours at 80 degrees (without specifying ° C. or ° F.), but some structural change was said to have occurred, since an average of 37% of the protein is said to have precipitated on shifting the pH to 4.7.

Clouding or creaming agents useful for still or carbonated beverages, especially acid types are described in U.S. Pat. No. 4,790,998, issued to Marsha Schwartz on Dec. 13, 1988, and entitled "Beverage Cloud Based On A Whey Protein-Stabilized Lipid". The composition of matter described comprises a whey protein-stabilized lipid emulsified in an acidic aqueous solution. The important features of the invention are said to include the balancing of the lipid system and the use of whey protein at pH levels of less than 4.5 to achieve acid emulsification stability. All ingredients are said to be natural, i.e., unmodified from the form typically found in nature.

U.S. Pat. No. 4,804,552 to Ahmed et al., issued Feb. 14, 1989, describes a method of carbonating a liquid dairy product to a level of "at least" 1.5 volumes of carbon dioxide dissolved in 1.0 volume of liquid dairy product, while not destabilizing the liquid dairy product. The liquid dairy product is heated to a temperature of at least 160° F. for a time not in excess of 30 minutes, followed by cooling to a temperature of less than about 50° F. The cooled liquid is then subjected to pressurized carbon dioxide to carbonate the dairy product to provide taste and mouth feel. The product is then packaged in closed containers capable of substantially retaining the degree of carbonation. The carbonated dairy product is said to be buffered to a pH of at least 4.0 while being highly carbonated but not destabilized.

U.S. Pat. No. 6,403,129, to Clark et al., issued Jun. 11, 2002, and entitled: "Carbonated Fortified Milk-Based Beverage And Method Of Making Carbonated Fortified Milk-Based Beverage For The Supplementation Of Essential Nutrients In The Human Diet", discloses dairy or non-dairy based fortified carbonated beverage solutions that supply nutrients in the human diet. The beverage described is said to have carbonation to enhance taste, improve body and mouth-feel and aid in the stabilization of milk protein such as Lactalbumin and Casein.

Published patent application US 2002/0127317 A1 of Hotchkiss et al., published Sep. 12, 2002, describes processes to inhibit or reduce the growth of bacteria and other pathogens in a liquid by adding carbon dioxide to the liquid, and thermally inactivating the bacteria and other pathogens. The process is said to be applicable to a wide variety of fluids, liquids, semi-solids and solids. Prior to or simultaneously with thermal inactivation carbon dioxide ($CO_2$) is added to the product by sparging or bubbling, preferably to obtain levels of about 400–2000 ppm. At this level of $CO_2$, the amount of microbial death that occurs during heating in a normal pasteurization (HTST) process is said to be increased by 10% to 90% over thermal inactivation carried out without the addition of $CO_2$ prior to the thermal inactivation step. After completion of the thermal inactivation process, the free $CO_2$ is said to be removed.

U.S. Pat. No. 6,761,920 to Jeffrey Kaplan, issued Jul. 13, 2004, and entitled: "Process For Making Shelf-Stable Carbonated Milk Beverage", describes an aerated or carbonated milk product drink made using a method which includes pre-heating, pressurized ultra-heat treating, subsequent carbonation with a gas or gases under pressure, and packaging into a container. The method of producing the shelf-stable carbonated milk product comprises injecting under pressure carbon dioxide gas or a mixture of gases into the milk product at low temperature of less than 10 degrees centigrade and high pressure of from 50 kpa to 200 kpa. In a typical process, as illustrated in FIG. 1, the milk product is pre-heat treated at a temperature of 80° C. to 138° C., followed by ultra-heat treatment from about 138° C. to about 150° C. in a holding tank, where it is held at a pressure of 700 KPA or an appropriate pressure. The carbonation may be achieved by direct injection of sterilized, purified carbon dioxide gas in a holding receptacle, or may be injected in line. Preferably the carbonation process is carried out at 2° C.±1° C. Then the carbonated liquid is transferred to a holding tank, where it is maintained at a pressure of 450 KPA and a temperature of 2° C. to 6° C. If, for some reason, the amount of carbonation of the pre-heated ultra heat treated milk product is insufficient, the product may be diverted to be reprocessed through the carbonater in a return loop to a holding tank to be re-pasteurized to be within the specification. After carbonation, the product is conveyed to a packaging station for packaging into sterile containers. The pH of the product is said to be preferentially maintained at 4.0 to 5.7 during packaging operations, depending on the product. After packaging the milk product into individual containers, it is said that the milk may be further sterilized by non-toxic radiation or pasteurization, however no enabling description of how this would be done is provided.

U.S. Pat. No. 6,866,877 to Clark et al., issued Mar. 15, 2005, entitled: "Carbonated Fortified Milk-Based Beverage And Method For Suppressing Bacterial Growth In The Beverage", describes dairy or non-dairy based fortified carbonated beverage solutions that supply essential nutrients in the human diet. In addition to describing the composition of a beverage, the patent discloses a method of using carbonization to reduce bacterial counts and reduce degradation of essential nutrients in milk-based beverages with or without pasteurization. In one embodiment, $CO_2$ is added pre-pasteurization to eliminate or effectively reduce the growth of bacterial colonies in the beverage and reduce degradation of nutrients if UHT pasteurization is used. If $CO_2$ is added pre-pasteurization, it is said that $CO_2$ must be reintroduced, since pasteurization disseminates most $CO_2$ present. This is done by in-line addition of $CO_2$ after the beverage's temperature is brought down from about 185° F.–215° F. to about 40° F. The $CO_2$ concentration in the final product is preferably from about 500 ppm to about 3,000 ppm. 1,000 ppm is said to be about 0.5 volumes of carbonation per volume of liquid beverage solution, so that the final product contains about 0.25 volumes to about 1.5 volumes of carbon dioxide per volume of liquid beverage solution.

As is illustrated above, there are a number of different factors which need to be considered in development of a carbonated protein drink. Some of the references appear to teach away from each other in terms of concentrations of protein which can be used in a carbonated protein drink, amount of carbonation which can be used (and still enable a shelf-stable beverage), and pH at which various protein-containing carbonated beverages are shelf-stable.

There is also considerable lack of detail in the processing method steps described, to the extent that one of skill in the art would not be enabled to produce a carbonated protein drink after minimal experimentation, in view of the description. Inactivation of microbes after carbonation of the beverage appears to be a problem, requiring subsequent "recarbonation" to ensure that the beverage has the proper taste and mouth feel.

The carbonated protein drink composition of the present invention, produced using the method described below, provides a high protein content (relative to previously described carbonated drinks) where the amount of carbonation is also high. In addition, while the carbonated protein drink has been heat treated to inactivate microbes, the final product exhibits storage shelf-stability which is unexpected for such a product.

DETAILED DESCRIPTION OF EXEMPLARY EMBODIMENTS

As a preface to the detailed description, it should be noted that, as used in this specification and the appended claims, the singular forms "a", "an", and "the" include plural referents, unless the context clearly dictates otherwise.

We have developed an improved carbonated protein beverage/drink, which contains a high protein concentration compared with protein concentrations previously known in the industry. The typical concentration of protein ranges from about 2% by weight to about 15% by weight, more typically the protein concentration ranges from about 3% by weight to about 10% by weight, with the most typical concentration ranging from about 5% by weight to about 8% by weight. Typically, the protein is essentially free from caseinate. Typically, the protein is whey protein of the kind previously described herein. The amount of carbonation which has achieved while maintaining stability of the carbonated drink is unexpectedly high in view of the amount of protein present, with the amount of carbonation ranging from about 0.1 volumes of carbonation (per volume of liquid present in the beverage) to about 4 volumes of carbonation. More typically, the amount of carbonation present ranges from about 1.6 volumes to about 3.5 volumes, with the most typical concentration ranging from about 1.7 volumes to about 3.0 volumes.

In addition to the high protein concentration in combination with a high carbonation content, the carbonated protein beverage is essentially free from biologically active microbes such as bacteria and other pathogens of the kind which are monitored by the food industry in general. Due to the method used to inactivate the biologically active microbes, the carbonated protein beverage is essentially free from these microbes for more than one year after packaging of the carbonated protein beverage into individual containers or servings and storage under shelf conditions which are standard in the unrefrigerated beverage industry. In addition to absence of biologically active microbes, there is no precipitation of protein, no thickening, flavor and color are maintained, and taste and mouth feel are maintained. In formulations which are designed to be clear in color, without turbidity, the carbonated protein beverage is clear in color after this storage period. The recommended storage temperature is above freezing (32° F.) to about 75° F. Efforts should be made to avoid storage of the carbonated protein beverage at temperatures in excess of 100° F. for time periods greater than about 5 months in length.

In one embodiment, the carbonated protein drink is heat treated to inactivate microbes in the presence of the carbonation which is used to provide taste and mouth feel for the drink, while maintaining the required minimal amount of carbonation to provide such taste and mouth feel. The treatment to inactivate microbes may include radiation, exposure to elevated temperature, or a combination of both. Typically, the treatment for microbe inactivation is carried out in the individual serving package used for storage and handling of the carbonated protein drink. Testing has shown that for microbe inactivation carried out in the individual serving package, plate count for microbes is negligible and typically zero after a storage period of more than one year at temperatures ranging between 35° F. and about 75° F.

A carbonated protein beverage of the invention may further contain additional agents that act, for example, to enhance the nutritional value and/or flavor value of the beverage, or which provide a desired appearance to the beverage, provided that the additional agent is stable in the beverage. Examples of additional agents include nutrients such as vitamins, minerals, calcium or a calcium derivative, herbal supplements, amino acids, fatty acids, and fiber. Examples include the following: Vitamins such as vitamin A, vitamin C, and vitamin E, by way of example and not by way of limitation; Minerals such as zinc, chromium, iron, calcium, magnesium, and potassium, by way of example; Herbal supplements such as ginseng, gingko biloba, saw palmetto, green tea, and hoodia gordonii, by way of example; Amino acids, such as L-Glutamine, L-Arginine, Taurine, N-acetyl-cystine, N-acetyl-carnitine, L-Leucine, L-isoleucine and L-valine, by way of example; Fatty acids such as docosahexaenonic acid (DHA), eicosapentaeonic acid (EPA), Omega 3's and Omega 6's, by way of example; Fiber such as oligofructopolysaccharides, corn fiber, oat fiber, and flax fiber, by way of example. The flavoring agent or agents may provide a fruit flavor, cola flavor, vanilla flavor, or a chocolate flavor, by way of example and not by way of limitation. Sweeteners, natural, or synthetic sugar, such as sucrose, sucralose, aspartame, and/or acesulfame potassium, polydextrose, glycerin, sorbitol, and xylitol, may be used, by way of example and not by way of limitation. Coloring agents may be added. Agents such as citric acid, fumaric acid, adipic acid, tartaric acid, and/or malic acid may be used to provide tartness.

Additional ingredients in the form of analgesics (e.g. aspirin), mild stimulants (e.g. caffeine), or relaxants, may be added in specialized product applications.

To provide stability, the carbonated protein drink typically includes an antifoaming agent such as dimethylpolysiloxane, and a pH adjusting agent such as phosphoric acid, citric acid, tartaric acid, fumaric acid, adipic acid, and in some instances lactic acid. Phosphoric acid is preferred as a pH adjusting agent, as the quantity required to obtain a desired pH is typically less, and the taste of the beverage is less affected by the pH adjustment. The adjusted pH of the carbonated protein drink typically ranges from about 2.0 to about 5.5, more typically from about 2.0 to about 3.4. To further provide stability, the carbonated protein drink is formulated to essentially exclude a component which includes caseinate, which is not stable at the pH of the carbonated whey protein beverage.

In the Examples described below, the protein used is whey protein, since this protein provides the best taste and offers other nutritional advantages of the kind previously discussed. However, one skilled in the art will understand that by adjusting the pH to extend into higher pH ranges and producing a carbonated protein drink having a protein content at the lower end of the protein concentration described herein, other proteins such as milk protein and soy protein, by way of example and not by way of limitation, may also be used to create the present carbonated protein beverage.

The carbonated protein drink may be prepared by admixing in water, an anti-foaming agent, an amount of a pH adjusting agent to provide a pH of about 2 to about 5.5 and an amount of protein sufficient to provide a final protein content in the beverage ranging from about 2% by weight to about 15% by weight protein; heating the admixture to a temperature ranging from about 140° F. to about 188° F. for a time period adequate to inactivate microbes which may be present in the admixture; cooling the admixture to a temperature of about 40° F. or less; and adding carbon dioxide to the admixture in an amount sufficient to obtain a carbonated protein beverage where the amount of carbonation present in the beverage ranges from about 0.1 volumes to about 4 volumes per volume of liquid admixture. In some embodiments of the method, the carbon dioxide is added in the form of sterile carbonated water. In other embodiments, sterile carbon dioxide is bubbled through the liquid admixture until the desired amount of carbon dioxide is present. In either embodiment, the final protein content of the beverage ranges from about 2% by weight to about 15% by weight, and the carbonation ranges from about 0.1 volumes to about 4 volumes.

The carbonated protein drink may also be prepared in a manner similar to that described above to the manner described above, with the exception that the heating of the admixture is carried out after addition of the carbonation rather than prior to addition of the carbonation. This requires that provisions be made to maintain the carbonation during the heating and cooling process. We have discovered that it is possible to maintain the carbonation if the carbonated protein beverage is packaged in individual size containers and the containers of beverage are then processed for microbe inactivation.

EXAMPLES

Example One

A carbonated protein drink was prepared in the following general manner. An anti-foaming agent was added to an amount of water that is about one half of the final volume of beverage to be made; typically other additives, of the kind which are described above, are also added to the water at this time. The pH of the water with anti-foaming agent (and other additives, depending on the final product desired) was adjusted to be in the range of about 2 to 3.4, typically using phosphoric acid. Whey protein was then added to the water/additives admixture. The admixture was heated to about 185° F. for about 20 seconds to inactivate microbes and then was cooled to about 40° F. Carbonated water which comprised from 0.2 to 8 volumes of carbon dioxide gas (per volume of water) was added to the cooled admixture in an amount so that the amount of carbon dioxide gas in the beverage totaled an amount which ranged from about 0.1 volume to about 0.4 volumes per volume of water.

If necessary, the final pH of the admixture may be adjusted to a pH ranging between 2 and 3.4 by addition of phosphoric acid.

Example Two

A carbonated protein drink was prepared in the following manner. An admixture of water, anti-foaming agent, other additives, and whey protein was prepared, and the pH was adjusted to be within a range between about 2 and 3.4. The volume of the admixture was such that when combined with the desired amount of carbon dioxide, the final volume of the carbonated admixture would be (as nearly as possible) that which is required to provide the desired composition of the carbonated protein beverage. The admixture was heated to inactivate microbes, using a technique known in the art. Carbon dioxide gas was then bubbled through the admixture to obtain a carbonation content ranging from 0.1 to 4 volumes of carbon dioxide gas. A small amount of additional water was added to reach the desired final concentration of water in the carbonated protein beverage, and the pH was readjusted using phosphoric acid, or another bio-compatible acid of the kind previously disclosed, to be in the range of about 2 to 3.4.

The whey protein used to make the better tasting carbonated beverage of the invention can be in the form of whey protein concentrate, where the whey protein generally makes up about 29 weight % to about 85 weight % of the whey protein concentrate. The whey protein used may be whey protein isolate, which contains at least 90% by weight whey protein. However, the final concentration of whey protein in a carbonated beverage of the invention ranges from about 2% by weight to about 15% by weight of the final carbonated protein beverage composition.

When sweetening agent, a particular flavor such as fruit flavor, chocolate or vanilla, for example, or combinations thereof is added, this is typically done prior to the carbonation step, as is the case with the nutrients and/or herbal supplements, for example.

With respect to Examples One and Two, additional ingredients may be added to produce specialized products, such as analgesics (e.g. aspirin), mild stimulants (e.g. caffeine), or relaxants. These ingredients are typically added to the admixture prior to both the heat treatment and carbonization steps, independent of the order in which these two steps are carried out.

After all of the ingredients are in the admixture, including the carbonation, the carbonated protein drink composition is typically aseptically dispensed into a large, bulk container or into individual containers such as a glass bottle, a plastic bottle, a tetra pak, or a can.

Example Three

This example provides a method for preparing 3,917 grams of a carbonated whey protein beverage. Into 1799 grams of water, the following were admixed: 315 grams of whey protein isolate (approximately 90% whey protein); 0.01 gram Designer Whey™ whey protein, available from Next Proteins International of Carlsbad Calif.; 30 grams of Taurine, available from Premium Ingredients, Franklin Park, Ill.; 0.37 grams of acesulfame-K sweetener; 0.46 grams of powdered sucralose sweetener; 7.9 grams of citric acid; 2.95 grams of malic acid; 0.25 grams of FG-10™ anti-foam, available from Dow Chemical Co.; 27 grams of phosphoric acid (75% by weight in water); 2.95 grams of Sunkist™ Spray Dried Orange Oil #61281165 flavoring; 3.4 grams of Firmenich Passion Fruit 860.344/TD 11.90 flavoring, available from Premium Ingredients, Franklin Park, Ill.; and 0.04 grams of FD &C Yellow #6 coloring, available from Seltzer Chemicals, Carlsbad, Calif., were added to a stainless steel 200 gallon mixing tank which employed a propeller prop mixer, which was typically operated at about 400 RPM to about 600 RPM for a time period of about 15 minutes. The order of addition of ingredients to the mixing tank was: water, acids, colors, flavorings, sweeteners, protein, pH adjusting acids, and antifoam. Typically the maximum temperature achieved during the mixing of ingredients was less than about 150° F.

The admixture described above was heated to about 185° F. for a time period of 20 seconds, and then was cooled to about 40° F. The admixture was not agitated during heating or cooling, but was passed through lines wrapped with heating or cooling coils. 1700 grams of soda water (water containing 3 volumes of carbon dioxide per volume of water), 27 grams of phosphoric acid (75% by weight acid in water), and 0.24 grams of the FG 10 anti-foam emulsion were added in that order to the admixture to obtain a final carbonated whey protein beverage which contained approximately 7% by weight whey protein, at a final pH of 2.7.

Example Four

This example is for preparation of a 60 gallon batch of carbonated protein drink. The mixing vessel and agitation was the same as that described with respect to Example Three. The mixing vessel and associated fluid flow lines were sanitized. All filters on the processing system were cleaned or replaced.

27 gallons of water was added to the mixing tank. The water was purified water, treated using reverse osmosis in a manner commonly used in the beverage industry.

0.054 pounds of acesulfame potassium was added to the agitating water in the mixing vessel over a 15 second time period.

0.08 pounds of sucralose powder was added to the agitating water in the mixing vessel over a 15 second time period.

0.005 pounds of Yellow #6 and 0.003 pounds of Red #40 were added to the agitating water in the mixing vessel over a 30 second time period.

The mixture in the mixing vessel was agitated at 400 RPM for a time period of one minute.

0.34 pounds of malic acid; 1.06 pounds of citric acid; 4.6 pounds of phosphoric acid; 0.26 pounds of Red Punch 586323 CE, available from Premium Ingredients, Franklin Park, Ill.; 0.46 pounds of Tropical Fruit 597540 C, available from Premium Ingredients, Franklin Park, Ill.; 0.46 pounds of Raspberry Flavor 01-EF956, available from Western Flavors and Fragrances, Livermore, Calif.; 3.96 pounds of Taurine, and 0.001 pounds of Designer Whey Natural™ were added over a 60 second time period. The combined admixture was then mixed for 2 minutes.

Subsequently, 0.06 pounds of FG-10 Anti foam, and 37.6 pounds of Whey Protein Isolate were then added over a 60 second time period, and the admixture was then agitated for a time period sufficient to obtain a homogeneous mixture (typically about 15 minutes at 400 RPM).

The pH of the admixture was then measured, and incremental amounts of about 3.5 pounds of Phosphoric Acid (75% by weight in water) were then added, with a one minute mix time between additions, until a pH of about 2.5 was obtained.

Brix, Color, and Turbidity were then measured or described and documented.

For the above formulation, one half of the volume of the finished product is carbonated water. The carbonated water was added to the mixing tank in a volumetric amount based on the volume of liquid present from previous preparation in the mixing tank. (The carbonated water contained 3 volumes of carbon dioxide per volume of water.) There is no need to extensively agitate the combined volumes of ingredients, since the carbonation is self-distributing. Further, rapid agitation would result in foaming of the batch of ingredients.

After addition of the carbonated water, the carbonated protein drink was treated to inactivate microbes and then packaged. Preferably, the treated carbonated protein drink product mixture is continuously agitated at a low agitation speed up to the time of packaging. In the event the product mixture is held longer than 30 minutes prior to microbe inactivation and packaging, the product mixture is re-circulated to assure adequate mixing and the turbidity, pH, color and Brix is performed and documented a second time to assure that product quality is satisfactory, prior to microbe inactivation and packaging.

The heat treatment temperature typically used for microbe inactivation is 188° F. or less. More typically, the maximum heat treatment temperature is about 150° F. In the present instance, the heat treatment was at 150° F., for a time period of 30 minutes.

After microbe inactivation, the carbonated protein drink product mixture was bottled into 500 ml PET bottles available from Novapak, Eatontown, N.J. The bottles were capped with Owens® 28 mm closures, available from Owens, Inc., Toledo, Ohio. The caps were torqued to the specification provided by the manufacturer. The filled bottles were tested for leakage to ensure integrity of the package.

Example Five

A carbonated protein beverage was prepared in the manner described in Example Two, with the exception that there was no heat treatment or cooling prior to the addition of carbonation. Subsequent to the carbonation step, (and final adjustment of the pH of the admixture to range between about 2 and about 3.4), the admixture was packaged. Packaging was in a beer/beverage can of the kind which is frequently used in the art, where the can employed an epoxy resin on the interior surface of the can. The epoxy resin coating was bisphenol A diglycidyl ether (BADGE). The end cap applied to the can was a 240 Stolle Loe cap, which was applied in a manner typically used in the beverage canning industry. The machinery used to accomplish the canning, and the 240 Stolle Loe cap are available from Stolle Machinery Company, LLC End and Metal Forming Division, Sidney Ohio. The carbonated protein beverage was charged into the beverage can at a temperature of less than 60° F., and the can was simultaneously evacuated of air and sealed by the apparatus.

The sealed can was heated using tunnel "pasteurization" to a maximum temperature of 150° F. and was held at this temperature for a time period of 20 to 25 minutes. The can was then cooled to room temperature over a time period of about 5 minutes.

Cans of the canned carbonated protein beverage were sampled and tested for microbes. The product specification limits for such testing were as follows.

| Specification | Specification Limit |
| --- | --- |
| Total aerobic plate count | NMT 10,000 cfu/g |
| Yeast and Mold | NMT 500 cfu/g |
| Coliforms | NMT 10 cfu/g |
| Escherichia Coli | Negative in 25 g |
| Staphylococcus Aureus | NMT 10 cfu/g |
| Salmonella | Negative in 100 g |

The test plate showed a complete absence of any of the microbes on the above listing, immediately after packaging and for a time period of 52 weeks thereafter, with testing continuing at this time.

The above described exemplary embodiments are not intended to limit the scope of the present invention, as one skilled in the art can, in view of the present disclosure expand such embodiments to correspond with the subject matter of the invention claimed below.

We claim:

1. A carbonated whey protein beverage composition suitable for human consumption, comprising:
   about 2% by weight to about 15% by weight whey protein, wherein the source of said whey protein is whey protein isolate that is essentially free of caseinate and lactose;
   about 0.1 volumes to about 4 volumes of carbon dioxide gas present per volume of whey protein beverage liquid composition; and
   wherein said carbonated whey protein beverage composition exibits a pH ranging from about 2.0 to about 3.4, wherein both, at the time of packaging of the carbonated whey protein beverage and during subsequent storage without refrigeration for a time period of at least one year after packaging, substantial solubility of the whey protein is maintained in the beverage composition, and said carbonated whey protein beverage is essentially free of active microbes known to be harmful to human health.

2. A carbonated whey protein beverage composition in accordance with claim 1, wherein said weight % of whey protein present ranges from about 3% by weight to abont 10% by weight.

3. A carbonated whey protein beverage composition in accordance with claim 2, wherein said weight % of whey protein present ranges from about 5% by weight to about 8% by weight.

4. A carbonated whey protein beverage composition in accordance with claim 1, or claim 2, or claim 3, wherein said essentially free from active microbe condition is created by the inactivation of microbes in the individual container in which said carbonated whey protein beverage composition is packaged.

5. A carbonated whey protein beverage composition in accordance with claim 4, wherein said inactivation was accomplished using a timed temperature condition of the carbonated whey protein beverage, while said carbonated whey protein beverage is contained in said individual container.

6. A carbonated whey protein beverage composition in accordance with claim 1, or claim 2, or claim 3, wherein said carbonation ranges from about 1.6 volumes to about 35 volumes per volume of liquid in said carbonated whey protein beverage.

7. A carbonated whey protein beverage composition in accordance with claim 6, wherein said carbonation ranges from about 1.7 volumes to about 3.0 volumes per volume of liquid in said carbonated protein beverage.

8. A carbonated whey protein beverage in accordance with claim 6, wherein said beverage comprises at least one additional ingredient selected from the group consisting of an anti-foaming agent, a nutrient, an herbal supplement, a flavoring agent, a sweetener, and a coloring agent.

9. A carbonated whey protein beverage in accordance with claim 1, or claim 2, or claim 3, wherein said beverage comprises at least one additional ingredient selected from the group consisting of an anti-foaming agent, a nutrient calcium or a calcium derivative, an herbal supplement, a flavoring agent a sweetener, and a coloring agent.

10. A method of preparing a carbonated whey protein beverage. comprising:
    admixing in water a whey protein isolate that is essentially free of caseinate and lactose to achieve a percent by weight of whey protein in the admixture of about 2% to about 15% an anti-foaming agent, and an amount of a ph adjusting agent to provide a ph of between about 2 and about 3.4, thereby obtaining an admixture;
    heating said admixture to atexuperature ranging from about 140° F. to about 188° F. for a time period ranging from about 60 seconds to about 10 seconds;
    cooling said admixture to a temperature of about 40° F. or less over a tame period ranging from about 5 minutes to about 10 minutes;
    adding carbon dioxide to said admixture to obtain a carbonated whey protein beverage wherein the amount of carbonation present in said admixture ranges from about 0.1 volumes per volume of liquid admixture to about 4.0 volumes per volume of liquid admixture; and
    packaging said carbonated whey protein beverage in a container which may be stored without refrigeration for more than one year before use by a consumer of the carbonated whey protein beverage.

11. A method in accordance with claim 10, wherein said temperature maximum duririgheatingis about 150° F.

12. A method in accordance with claim 10 or claim 11, wherein additional ingredients are admixed into said admixture prior to heating of said admixture, and said additional ingredients include at least one ingredient selected from the group consisting of a nutrient, an herbal supplement, a flavoring agent; a sweetener, and a coloring agent.

13. A method in accordance with claim 12, wherein said carbonated whey protein beverage is clear in color, exhibiting essentially no turbidity.

14. A method of preparing a carbonated whey protein beverage, comprising:
    admixing in water a whey protein isolate that is essentially free of caseinate and lactose to achieve a percent by weight of whey protein in the admixture of about 2% to about 15%, an anti-foaming agent, and an amount of a pH adjusting agent to provide a pH of between about 2 and about 5.5, thereby obtaining an admixture;
    adding carbon dioxide to said admixture to obtain a carbonated protein beverage wherein the amount of carbonation present in said admixture ranges. from about 0.1 volumes per volume of liquid admixture to about 4.0 volumes per volume of liquid admixturer;
    packaging said carbonated whey protein drink beverage in a container designed for use by a consumer of the carbonated whey protein beverage; and
    treating said admixture to inactivate biologically active microbes;
wherein the packaged and treated carbonated whey protein beverage may be stored without refrigeration for more than one year before use by a consumer of the carbonated whey protein beverage.

15. A method in accordance with claim 14, wherein said pH maximum is about 3.4.

16. A method in accordance with claim 14 or claim 15, wherein additional ingredients arc admixed into said admixture prior to inactivation of said biologically active microbes, and said additional ingredients include at least one ingredient selected from the group consisting of a nutrient, an herbal supplement, a flavoring agent, a sweetener, and a coloring agent.

17. A method in accordance with claim 16, wherein said carbonated whey protein beverage is clear in color, exhibiting essentially no turbidity.

18. A method in accordance with claim 14 or claim 15, wherein said treatment of said admixture to inactivate biologically active microbes is carried out in an individual container in which said carbonated whey protein beverage is subsequently stored and handled by a consumer of the beverage.

19. A method in accordance with claim 18, wherein additional ingredients are admixed into said admixture prior to inactivation of said biologically active microbes, and said additional ingredients include at least one ingredient selected from the group consisting of a nutrient, an herbal supplement, a flavoring agent, a sweetener, and a coloring agent.

20. A method in accordance with claim 19, wherein said carbonated whey protein beverage is clear in color, exhibiting essentially no turbidity.

* * * * *

UNITED STATES PATENT AND TRADEMARK OFFICE
CERTIFICATE OF CORRECTION

PATENT NO. : 7,205,018 B2
APPLICATION NO. : 11/215524
DATED : April 17, 2007
INVENTOR(S) : Shawn Sherwood et al.

It is certified that error appears in the above-identified patent and that said Letters Patent is hereby corrected as shown below:

Claim 10, column 11, line 41, delete "atexuperature" and insert -- a temperature --

Claim 10, column 11, line 45, delete "tame" and insert -- time --

Claim 11, column 11, line 57, delete "duririgheatingis" and insert -- during heating is --

Claim 14, column 12, line 18, delete "ranges." and insert -- ranges --

Claim 14, column 12, line 20, delete "admixturer" and insert -- admixture --

Signed and Sealed this

Fifth Day of June, 2007

JON W. DUDAS
*Director of the United States Patent and Trademark Office*